United States Patent [19]
Eiler

[11] Patent Number: 6,058,158
[45] Date of Patent: May 2, 2000

[54] X-RAY DEVICE FOR CHECKING THE CONTENTS OF CLOSED CARGO CARRIERS

[76] Inventor: Peter Eiler, Elisabehtrasse 25, D-26135 Oldenburg, Germany

[21] Appl. No.: 09/109,624

[22] Filed: Jul. 2, 1998

[30] Foreign Application Priority Data

Jul. 4, 1997 [DE] Germany .................... 197 28 753
Jun. 15, 1998 [DE] Germany .................... 198 26 560

[51] Int. Cl.[7] ............................................... G01N 23/04
[52] U.S. Cl. .................. 378/57; 378/51; 378/55; 378/197; 378/198
[58] Field of Search ............... 378/57, 197, 198, 378/51, 53, 54, 55, 146

[56] References Cited

U.S. PATENT DOCUMENTS

| | | | |
|---|---|---|---|
| 5,638,420 | 6/1997 | Armistead | 378/57 |
| 5,692,028 | 11/1997 | Geus et al. | 378/57 |
| 5,764,683 | 6/1998 | Swift et al. | 378/57 |
| 5,838,759 | 11/1998 | Armistead | 378/57 |
| 5,903,623 | 5/1999 | Swift et al. | 378/57 |

*Primary Examiner*—David P. Porta
*Assistant Examiner*—Allen C Ho
*Attorney, Agent, or Firm*—Collard & Roe, P.C.

[57] ABSTRACT

An x-ray examination device for checking the contents of closed cargo carriers having two steerable single-track carriages disposed parallel to each other, wherein the carriages each support a vertical column. The free ends of the columns are connected to each other by means of a yoke spanning the space between the carriages, which corresponds to the maximal possible width of the cargo containers. The yoke can be raised and lowered on the two columns. Cantilevers are aligned horizontally, and parallel relative to each other, and are arranged on the yoke. The free ends of the cantilevers support a cross bar. Connected to one end of the cross bar are supports for supporting the x-ray equipment. The x-ray equipment includes an x-ray emitter and an x-ray receiver. Moreover, one or more screen vehicles having leaded mesh screens for surrounding the cargo containers are provided to shield against harmful x-rays outside the cargo container area.

22 Claims, 11 Drawing Sheets

X-RAY DEVICE FOR CHECKING THE CONTENTS OF CLOSED CARGO CARRIERS

BACKGROUND OF THE INVENTION

Field of the Invention

The invention relates to a device for checking the content of closed cargo carriers or containers, through use of x-rays.

SUMMARY OF THE INVENTION

The present invention provides a device for x-raying containers, which is capable of traveling along the parked containers at their storage site. These containers are stacked one on top of each other. The x-ray device is designed to drive past these containers while checking their contents.

In the invention, two steerable single track carriages are disposed in parallel with each other, each supporting a vertical column. The free ends of the columns are connected to each other by means of a yoke spanning the spacing between the carriages. This spacing corresponds with at least the maximal possible width of each container, whereby the yoke is guided on two columns in such a way that it can be raised and lowered. In addition, supporting elements for a cross bar are arranged on the yoke, wherein the cross bar bridges the space between the carriages. The cross bar has x-ray equipment supports on the end sides. These supports allow an x-ray apparatus in the form of radiation source on one side, and an x-ray receiving screen attached to the other side.

The device is capable of traveling along rows of stored and stacked containers like a gantry crane, typically used for handling the transloading containers. The carriages are driven along both sides of a container, or a stack of containers, and the yoke is guided across the top side of these containers. Two columns are each arranged in the center of their associated carriages and carry the supporting elements for supporting the cross bar. The cross bar contains the supports for carrying the components of the x-ray machine.

Each column consists of a fixed segment, and at least one displaceable segment. The displaceable segment can extend longitudinally on the fixed segment like a telescope, whereby the displaceable segments of the two columns are connected to each other by the yoke. The height of the yoke can be adjusted by longitudinally extending the sliding displaceable segments relative to the fixed segments. Because these segments are longitudinally displaceable, they can be used to guide the x-ray equipment supports along the vertical expanse of one or a plurality of containers. The movability of the entire device allows it to be driven with the x-ray machine along the containers in a longitudinal direction.

The supports carrying the components of the x-ray equipment can be lowered by longitudinally displacing the sliding segments of the columns. This is necessary because containers are deposited, in most cases, on the ground of the storage site on which the device is driven. The ground clearance required for the carriages limit the downward travel of the displaceable segments and consequently also the extent to which the supports of the x-ray equipment can be lowered in the direction of the ground. This is because the displaceable segments are normally downwardly extendible only to the footing of the fixed segments.

To increase the displacement distance of the displaceable segment towards the ground, each carriage is designed so that the surface of each of the displaceable segments is capable of extending over the carriage. These ends have release mechanisms on both sides.

To make the carriage sufficiently stiff so that it will hold its track when driven, each column has a rectangular shape, whereby the longitudinal sides of the column sections are aligned parallel with the longitudinal axis of the carriages. The displaceable segments are designed to slide along with the fixed segments. In one embodiment, the displaceable segments can be designed as rectangular sections dimensioned to accommodate the fixed segments within themselves. In another embodiment, the inner surface of each displaceable segment is guided on the outer surface of each fixed segment with sliding and guiding elements.

The supporting elements are arranged on the yoke. However, the supporting elements could be arranged also on the displaceable segments.

Using larger track widths of the device, it is possible to bring the cross bar close to the columns. In this case, the cantilever supports representing relatively short lever arms can be mounted on the columns through the support elements. However, if the track width of the device is rather narrow and extends only slightly beyond the width of the container, additional projecting support elements are required. The components of the x-ray equipment, namely the emitter and the receiver, must have a predetermined spacing between each other, so that the range of the x-rays can fan out adequately. If the spacing between the components of the x-ray machine requires certain projections beyond the track width, then the cantilevers can extend behind one end of the device. In this way, the supporting elements are aligned substantially horizontal and parallel, relative to each other and hold the components of the x-ray equipment so that they are disposed behind one end of the device. Therefore, the x-ray equipment can be placed practically behind or in front of the carriages, depending on the driving direction. In this way the x-ray equipment does not need to project beyond the track width.

Furthermore, if the operator is positioned at the opposite end of the device, he minimizes his risk of exposure by outstretching the cantilevers. As the cantilevers project outwardly bending moments can occur. To counteract these forces, platforms can be arranged on the yoke on the side facing away from the cantilevers. In addition, the platforms can support the operating controls, the control or power supply of the x-ray apparatus, and an operator's cabin. Such devices on the platforms form a counterweight for the cantilevers, so that there are little unilateral bending stresses on the columns.

Each cantilever is designed in the form of a rod to reduce the weight of the cantilevers, and to obtain an adequately stiff steel construction. The crossbeam with the x-ray equipment supports is rotatably supported on the supporting elements, on the points of the cantilevers, turning around a horizontal axle. In this way, the center of gravity of both the x-ray equipment supports, and the x-ray equipment is disposed behind the free ends of the supporting elements, spaced away from the axis of rotation.

It is advantageous to provide at least one support counteracting rotation relative to the associated column or to the yoke. A vibration damper, or a damping element can then be integrated in this support, so that the x-ray machine is prevented from swinging due to acceleration forces. The support may comprise at least one connecting bar to connect with the associated column or yoke, with the connecting bar having at least one damping element, and being under tensile load when rotating.

Each supporting element, and in particular, each cantilever may be formed by a rod with joint elements. Such a rod is equipped with operating cylinders permitting forced rotation the x-ray equipment supports around the axis of rotation. The components of the x-ray equipment could be driven into predetermined positions with the help of controlling and adjusting elements by extending or retracting the operating cylinders or a driving means.

The rod mechanism for a cantilever can be designed similar to a parallelogram steering linkage. In this case, the x-ray equipment carrier or support can be adjusted relative to the column, parallel with the longitudinal direction of the carrier.

One advantage of the device is that the assemblies and components can be mounted or dismantled in a quick and simple way, which facilitates the shipping of individual parts. The assemblies are, for example, the columns, the carriages, the yoke, and the cantilevers.

A screening system is used to prevent scattered x-rays when the device is in operation. This screening system covers predetermined areas of a container on both sides of the plane of radiation. The plane of radiation extends between the emitter and the receiver of the x-ray apparatus, or within the cone of x-rays formed when the radiation energy fans out from the emitter. For example, the screening device may be a hood, which can be put over a container. The hood has a gap corresponding with the plane or cone of radiation, so that there is free passage of the rays within the zone of the gap.

The hood is designed in the form of a tunnel-shaped hood, so that it can be moved together with the device across a container. The walls of each tunnel-shaped hood consist of a screening material in the form of plates, mats or the like that are preferably made of lead.

Each screening device is equipped with carriages. It can be driven separately or jointly with the device when the latter is in operation. Each screening device can be designed in the form of a self-propelled system with its own drive and its own steering. However, it is possible that the screening device may consist of a number of tunnel hoods coupled together, that are pulled along by the device when it travels along a container. However, engineering problems can arise if the device is designed so that it can support the heavyweight screening devices, since the screens may comprise several tons of lead. It is advantageous if the screening device is designed in the form of a so-called self-propelled system.

A synchronization system can be incorporated into the invention to coordinate drives and controls or steering systems of the screening device, or of individual tunnel hoods, so that there is a completely uniform driving mode of all carriages. The individual tunnel hoods can be synchronized to drive uniformly, so that their driving motion is completely synchronized with the driving mode of the device carrying the x-ray equipment.

To enhance the screening effect, the walls of each tunnel hood extend downwardly by means of screening aprons on the side of the tunnel hood facing the receiving screen of the x-ray apparatus. These aprons assure that a screening effect is obtained also within the zone of the "ground clearance" required for driving. This zone is between the carriages, which is limited at the bottom by the surface of the driving lane (ground), and at the top, by the lower edge of the respective wall of a tunnel hood.

The invention can also contain an actuating device for aprons designed like Venetian blinds, wherein the aprons can be moved in pre-determinable screening positions. For example, each apron can be guided with vertical mobility in suitable guides on a tunnel hood, whereby there is at least one drive for the sliding movement along the guides. Each apron may be a plate made of screening material, for example lead, and can be raised or lowered in suitable lateral guides. Each drive can be an operating cylinder. However, other types of drives are also possible, for example hoists with toothed racks, ropes, sprocket chains, etc.

The cone of radiation or radiation plane present during operation between the emitter and the receiver of the x-ray apparatus extends through a corresponding slot in the screening device. The slot is formed by a separation joint between two tunnel hoods driving in "tandem", one after the other. The occurrence of scattered x-ray is the greatest in zones adjacent to the separation joints, where an adequately safe screening effect is required. For this reason, the greatest thickness of the screening material is provided in these zones. The increase in weight caused by this material accumulation requires a corresponding increase in load capacity of the carriages. Twin wheels mounted on one axle would be sufficient to increase the load capacity. However, in this design an undesirable result is that the track width of these carriages would be reduced by these wheels. Therefore, the carriage of each tunnel hood has multiple-axles within the zone where the device's own weight is the highest.

BRIEF DESCRIPTION OF THE DRAWINGS

Other objects and features of the present invention become apparent from the following detailed description considered in connection with the accompanying drawings which disclose several embodiments of the present invention. It should be understood, however, that the drawings are designed for the purpose of illustration only not as a definition of the limits of the invention.

In the drawings, wherein similar reference characters denote similar elements throughout the several views.

DETAILED DESCRIPTION OF PREFERRED EMBODIMENTS

Figure 1:
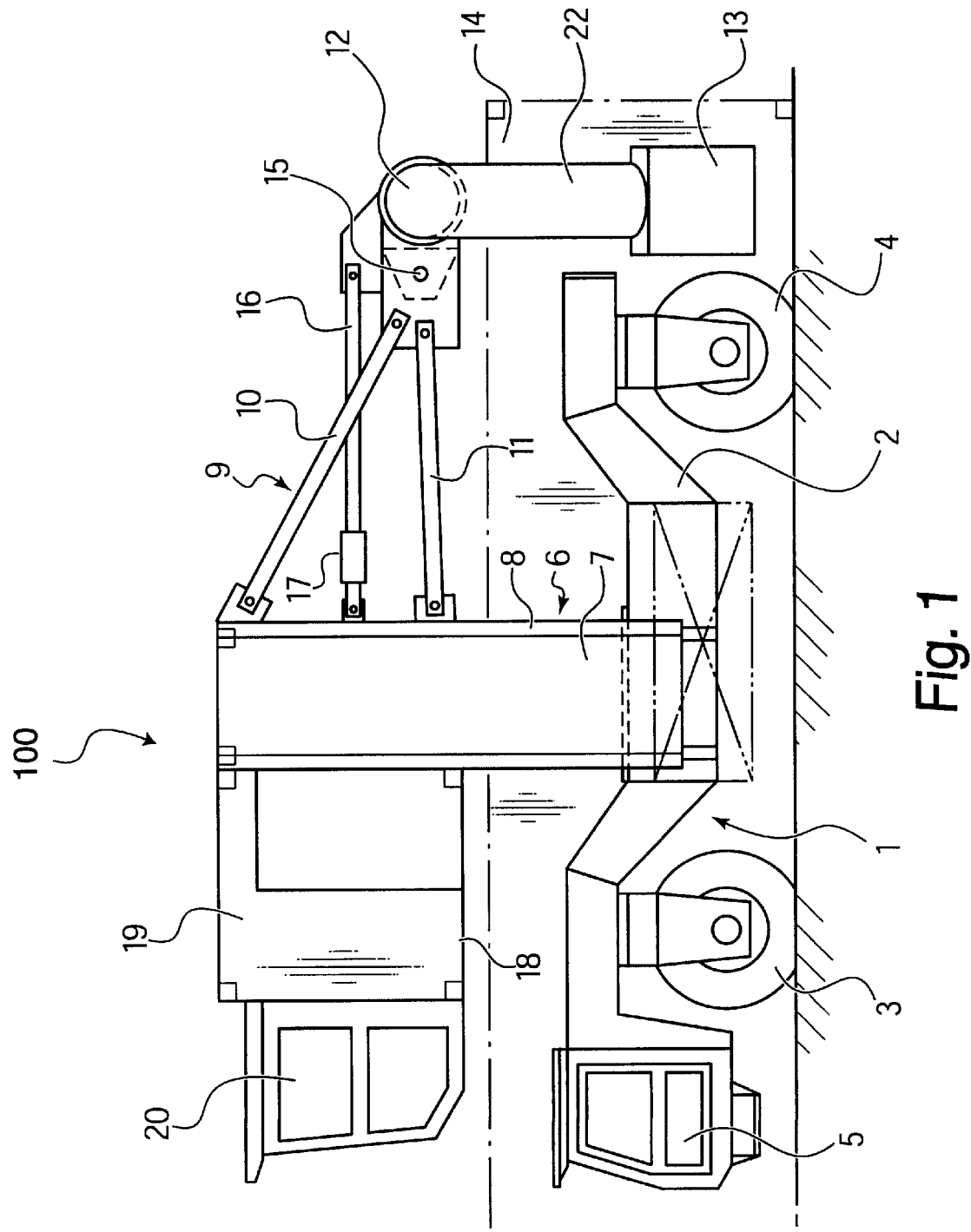
FIG. 1 is a side view of a first embodiment of the invention shown in a lowered operating position.

Referring to FIG. 1 there is shown a single-track carriage 1 comprising an carriage support 2, which has a dropped center, and includes a pair of front wheels 3, and rear wheels 4. A driver's cabin 5, is disposed in the front of carriage support 2, and located on the front side of device 100.

A vertical column 6 is arranged in the center of carriage support 2, and consists of an inner fixed segment 7, that is connected on the floor of carriage 2, and includes an outer displaceable segment 8. In this case, fixed segment 7 accommodates displaceable segment 8 which is guided in the longitudinal direction of fixed segment 7 through a driving means.

A cantilever 9, serving as a support element, is designed as a rod as shown by rods 10 and 11. The free end of cantilever 9, supports a cross bar 12 for arranging the components of an x-ray apparatus. The x-ray apparatus includes radiation source 13, on one side, and receiving screen 24 on the other side, (See FIG. 4).

Cross bar 12 is rotatably supported on an end point of cantilevers 9, and rotates around a horizontal axle 15. In addition, there is at least one connecting bar 16 connected with associated column 6. This connecting bar is subjected to tensile stress when rotating. Connecting bar 16 may be equipped with a damping element 17.

On the side opposite cantilever 9 is platform 18 projecting from column 6. Platform 18 carries equipment 19 comprising the operating controls, and the control or power supply for the x-ray apparatus. In addition, the operator's cabin 20 is located on platform 18.

Driver's cabin 5 can be omitted and may be integrated in operator's cabin 20, or vice versa, while operator's cabin 20 may be integrated in driver's cabin 5.

Figure 2:
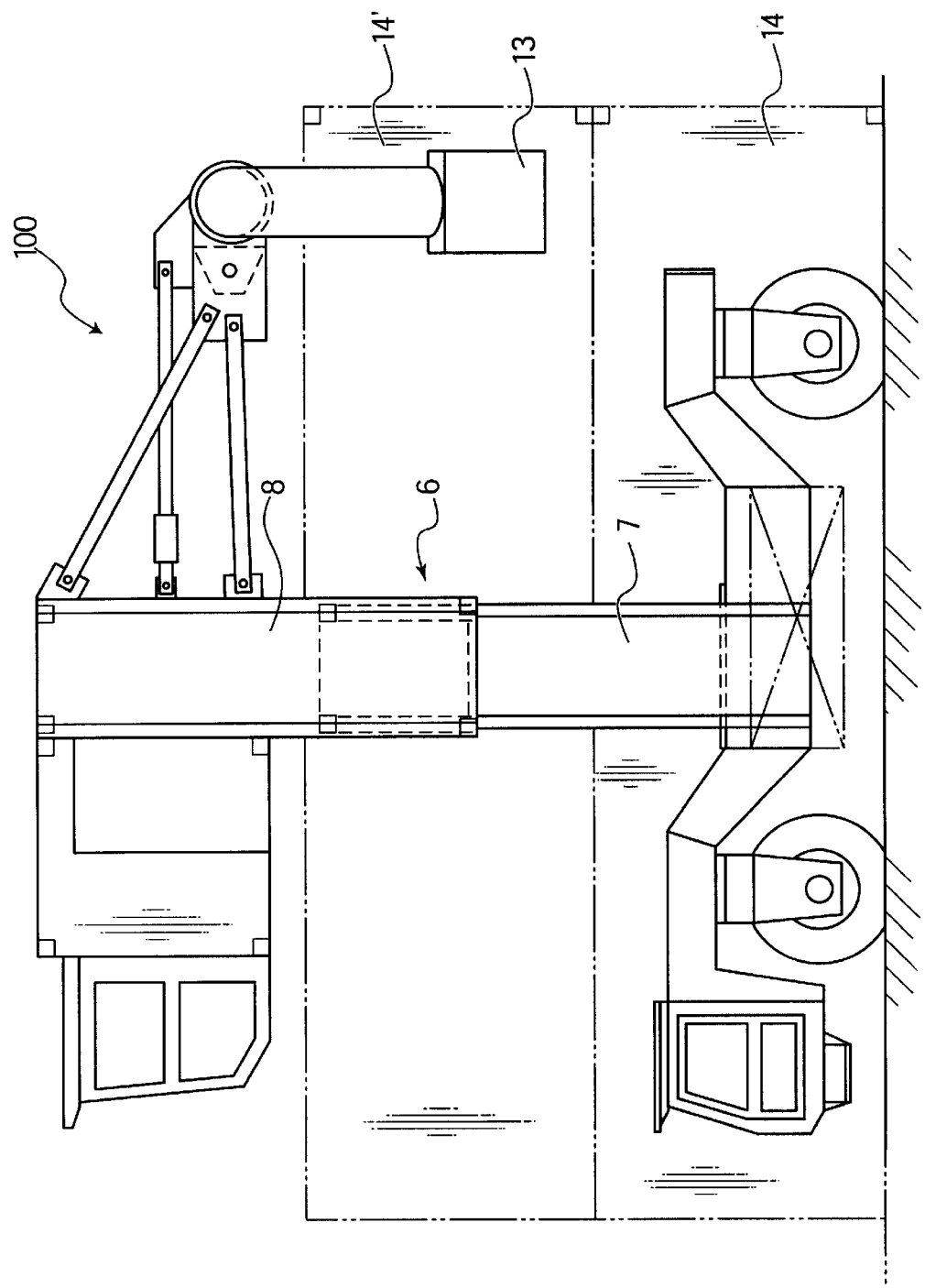
FIG. 2 is a side view of the device according to FIG. 1 shown in the raised operating position.

FIG. 2 shows device 100 according to FIG. 1 in an operating position, in which displaceable segment 8 of column 6 is extended upwardly relative to fixed segment 7. The outlines of the two stacked containers 14, and 14', are indicated by dash-dotted lines. In this operating position, the x-ray equipment, as shown by radiation source 13, can be driven also along top container 14'.

Figure 3:
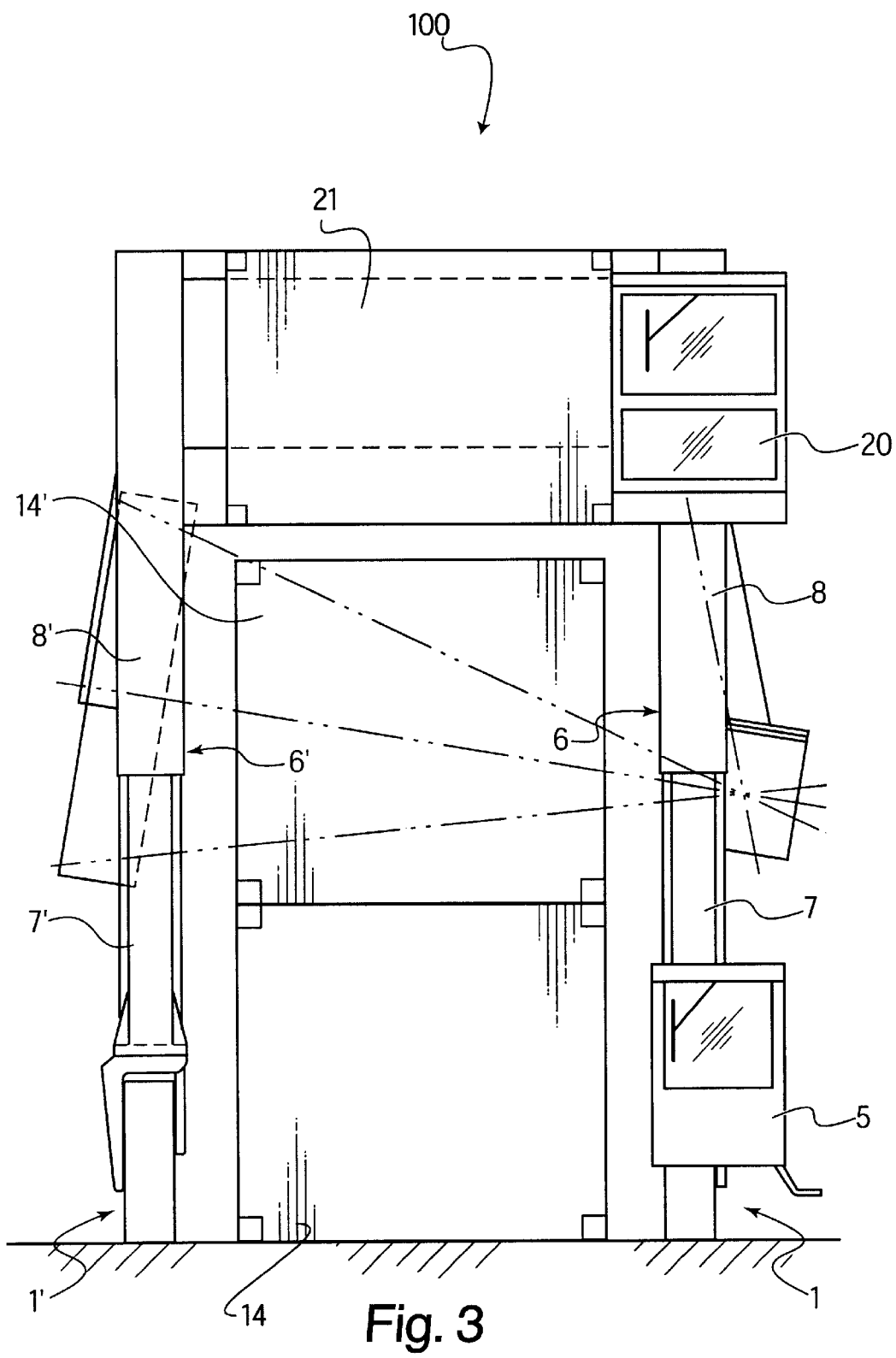
FIG. 3 is a front view of the device according to FIG. 2.

FIG. 3 shows a front view of device 100 according to FIG. 2, wherein the free ends of columns 6 and 6' are connected to each other by means of a yoke 21 bridging or spanning the space between carriages 1 and 1'. In this case, the spacing approximately corresponds with the maximum possible width of a container 14 or 14'.

Figure 4:
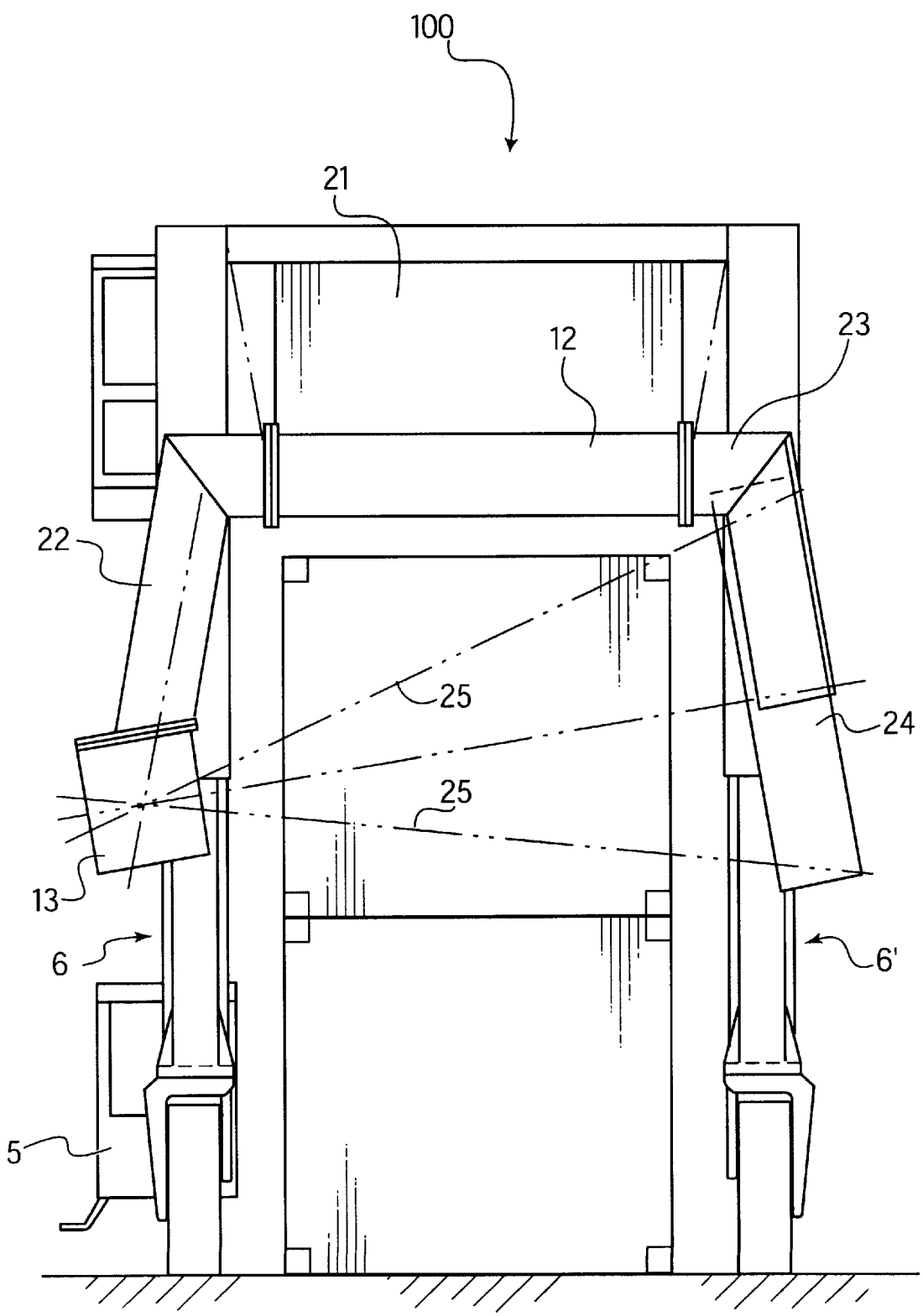
FIG. 4 is a rear side view of the device according to FIG. 2.

FIG. 4 is a rear side view of device 100 opposite driver's cabin 5. In FIG. 4, a cross bar 12 is connected to x-ray equipment supports 22, and 23. Support 22 supports radiation source 13 on one side of device 100 and support 23 supports receiving screen 24 on the other side. The fanned-out beam emitted by radiation source 13 is indicated by dash-dotted lines 25.

Figure 5:
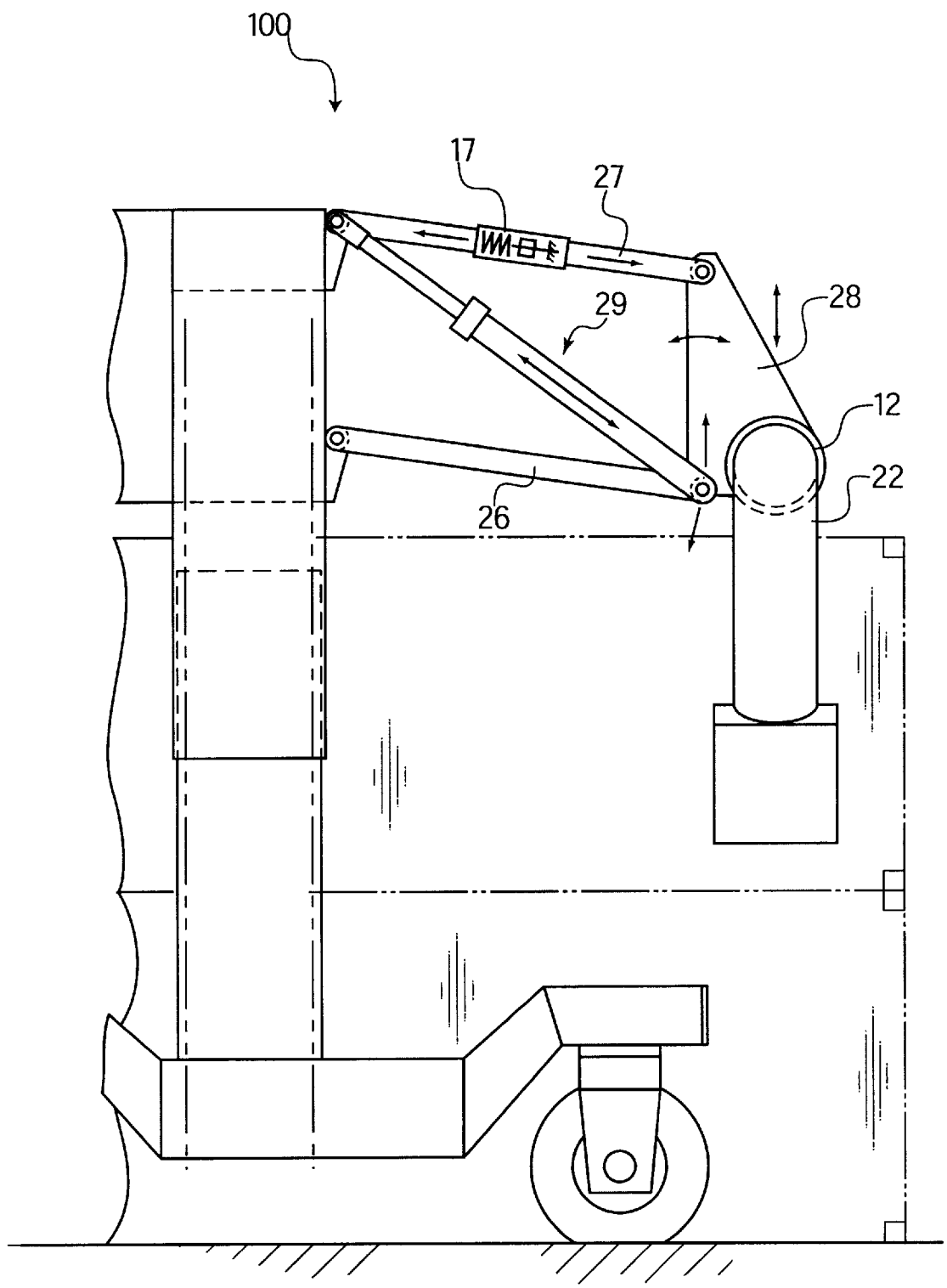
FIG. 5 is a side view of an additional embodiment of the cantilevers of the device according to FIG. 1.

FIG. 5 shows an additional embodiment of cantilever 9 with x-ray equipment support 22 on cross bar 12. In this embodiment, the rod mechanism comprises a lower guide rod 26 as well as an upper guide rod 27. With their articulation points on a head 28 holding cross bar 12, these guide rods form a parallelogram. Upper guide rod 27 is equipped with a damping element 17. A diagonal rod 29 is designed in the form of an operating cylinder, so that by actuating both the detecting damping device and the operating cylinder of diagonal rod 29, x-ray equipment support 22 can be both swivelled, and raised and lowered in the directions of the double arrows shown in FIG. 5.

Figure 6:
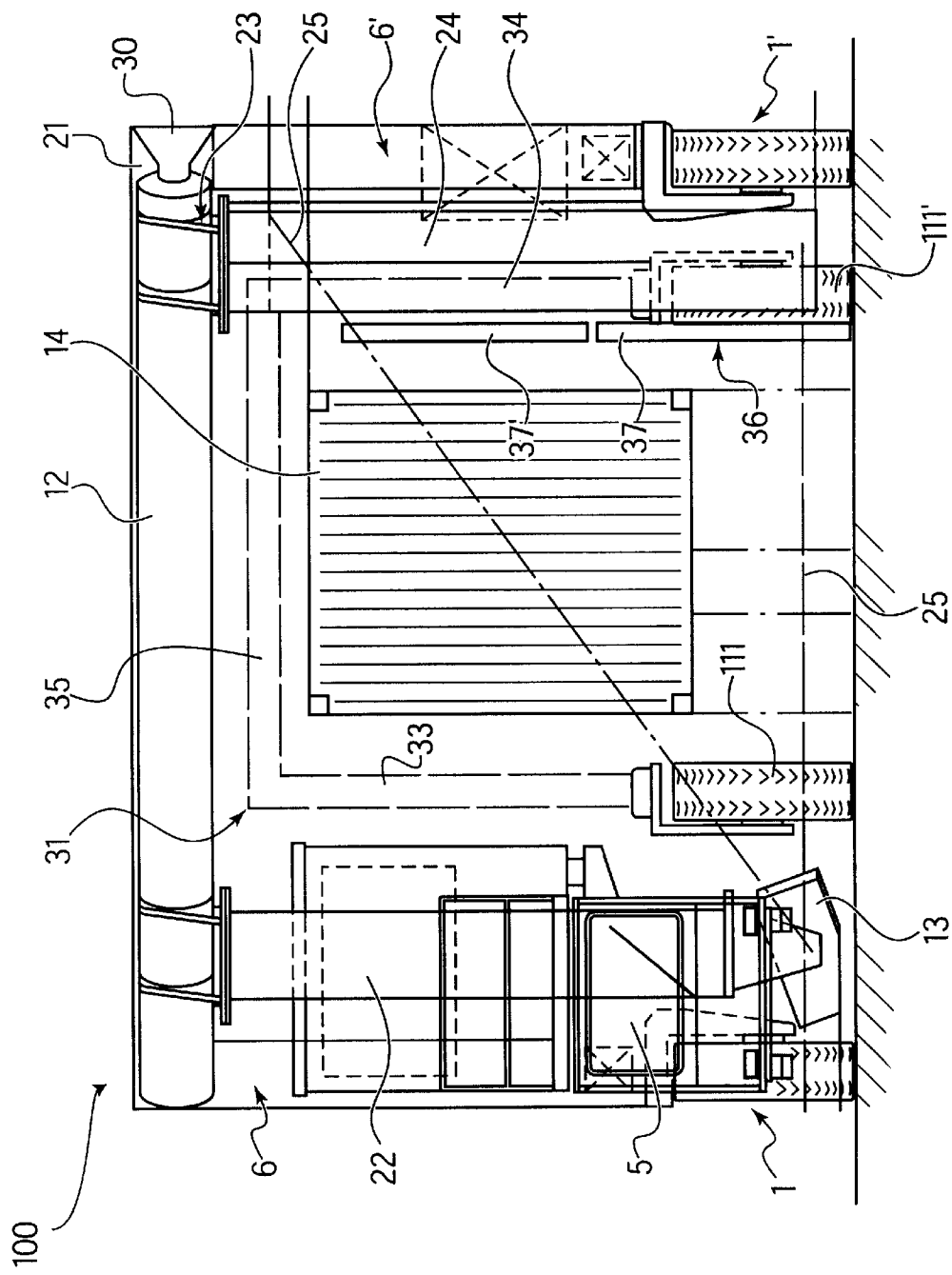
FIG. 6 is front view of a device according to a third embodiment having a screening device.

FIG. 6 shows a schematic front view of an additional embodiment of device 100. In this embodiment two carriages 1, and 1' with columns 6, and 6' and top yoke 21 connect the columns and form a carriage designed similar to a gantry crane. In front of yoke 21, cross bar 12 is supported by supporting elements 30 and 30' (FIG. 7) and project out from the plane of the drawing. On the left side of FIG. 6, x-ray equipment support 22 is connected at its top end to cross bar 12 and to radiation source 13 at its bottom end. The right side of FIG. 6 shows the section of cross bar 12 facing supporting element 30, and has the x-ray equipment support (carrier) 23. Support carrier 23 is substantially shortened in this embodiment as compared to the design in FIG. 4. Receiving screen 24 of the x-ray machine is mounted on a flanged surface on equipment support 23. The range of the radiation cone or radiation plane emitted by the radiation source is indicated by dash-dotted lines 25.

Because of the increased track width of device 100, a screening device 31 can drive under the gantry-type carriage formed by yoke 21, columns 6, and 6' and carriages 1, and 1'.

Screening device 31 comprises one or a plurality of tunnel hoods 32, and 32' (FIG. 7) covering one or a plurality of containers 14, 14'. The walls of these tunnel hoods are in areas provided with linings made of material screening x-rays. In FIG. 6, tunnel hood 32 is outlined by dash-dotted lines 35 indicating its left side wall 33, right side wall 34, and upper cover wall 35. Lead in the form of plates, mats or the like can be used as a screening material.

The dead weight of lead screening device 31 is considerably high. Therefore, to reduce the weight on carriages 1 and 1', the screening device 31 is made free standing, and is equipped with separate under-carriages 111 and 111'. This means that each screening device 31 is a self-propelled device with its own drive and separate controls. The invention also contains a device located with components 19 and with screening device 31 for synchronizing the driving modes of device 100 and screening devices 31. Therefore with the use of a cable or by radio control screening device 31 can be driven in sync and in parallel with device 100. FIG. 6 indicates that device 100 and tunnel hoods 32, 32' of screening device 31 drive along container 14 in the longitudinal direction.

The lower wall areas of each tunnel hood are formed by walls 33, 34, 35 that are disposed directly adjacent to receiving screen 24 of the x-ray apparatus, and are extendible by means of vertically movable screening aprons 36. Each apron 36 is formed by a plate 37, 37' guided in vertical guides. A drive for sliding motion along the guides is associated with each apron 36. FIG. 6 shows a downwardly lowered apron 37 and an apron 37' raised into the driving position. Operating cylinders can serve as drives to raise and lower aprons 36.

Figure 7:
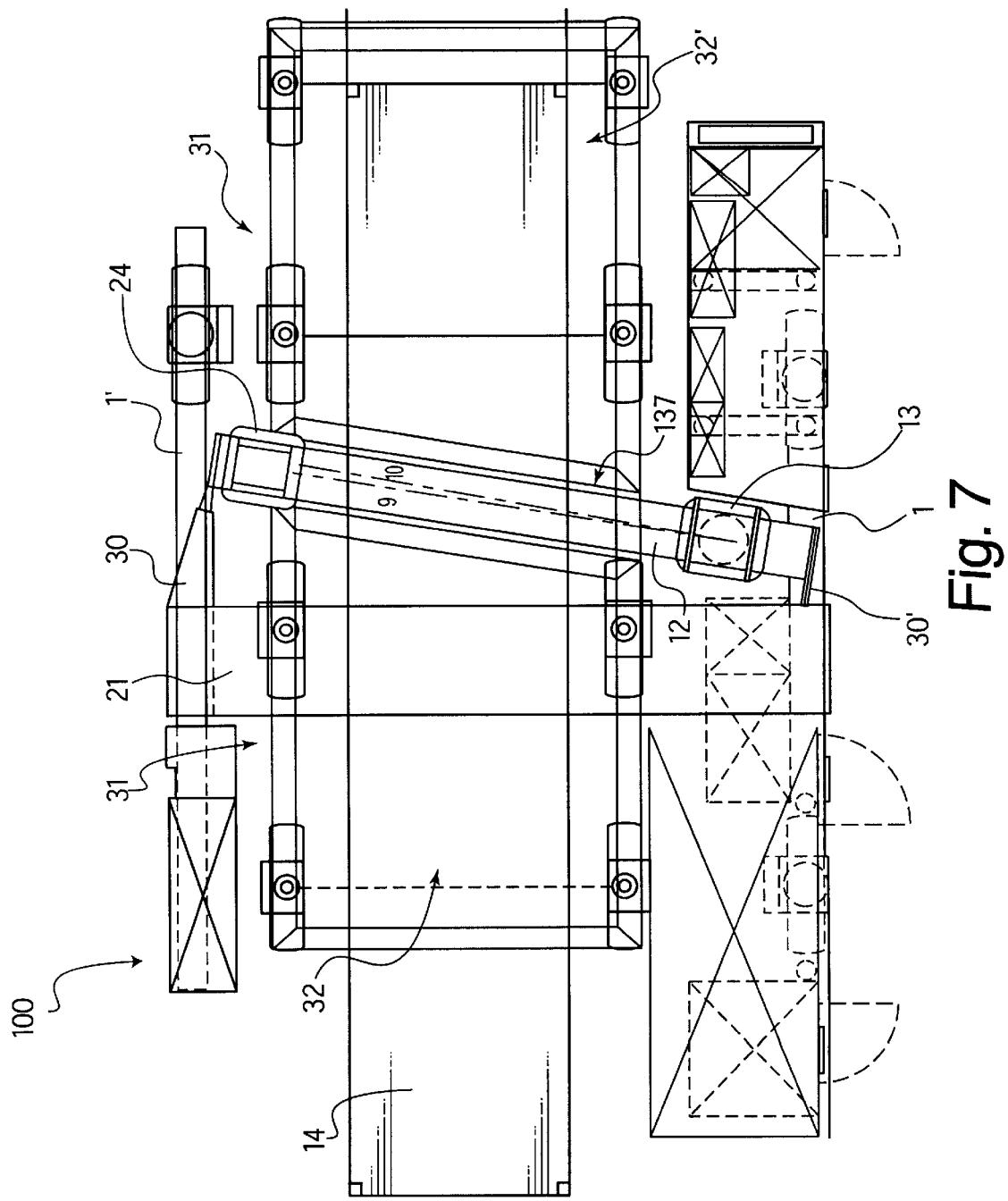
FIG. 7 is a top view of the device shown in FIG. 6.

FIG. 7 is a top view of device 100 of FIG. 6 and shows second supporting element 30' for cross bar 12. This view shows that screening device 31 consists of two separate tunnel hoods 32 and 32' driving one after the other. On their end sides facing each other, tunnel hoods 32 and 32' are beveled, and are held apart from each other. In this way, cross bar 12 is supported on yoke 21, and the x-ray equipment carried by cross bar 12 is freely and independently movable up and down in gap 137.

Figure 8:
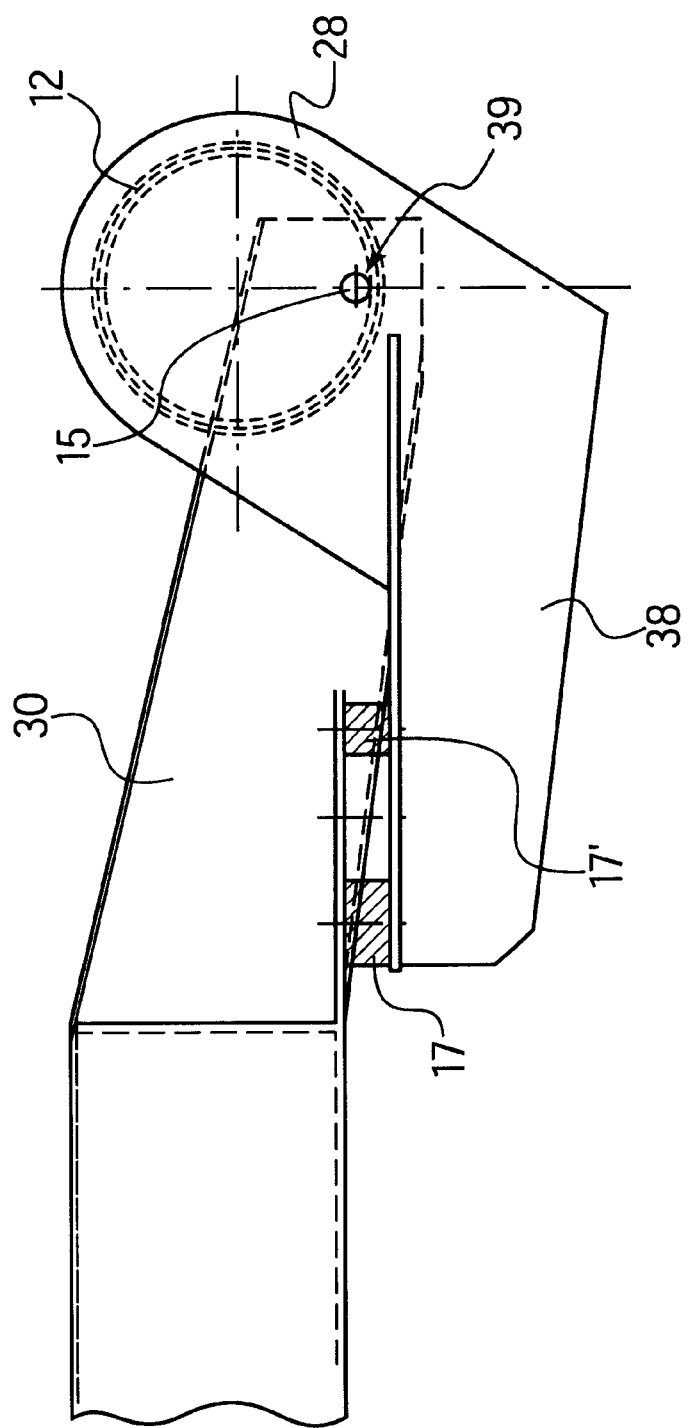
FIG. 8 is a side view of a supporting element for the crossbeam with supports for the X-ray equipment.

FIG. 8 shows a side view of a supporting element 30. On the end side, cross bar 12 is provided with a head 28 ending in a lever arm 38. Cross bar 12 with head 28 and lever arm 38 is rotatably supported in a pivot bearing 39. Pivot bearing 39 rotates about an axle 15, and extends parallel with the longitudinal central axis of cross bar 12. When x-ray equipment supports 22 and 23 vibrate, this causes a swinging motion of cross bar 12 around the axis of rotation 15.

Damping elements 17 and 17' are disposed between lever arm 38 and supporting element 30. These damping elements absorb the oscillations of cross bar 12 or the lever forces of lever arm 38 transmitted to damping elements 17, and 17'.

Figure 9:
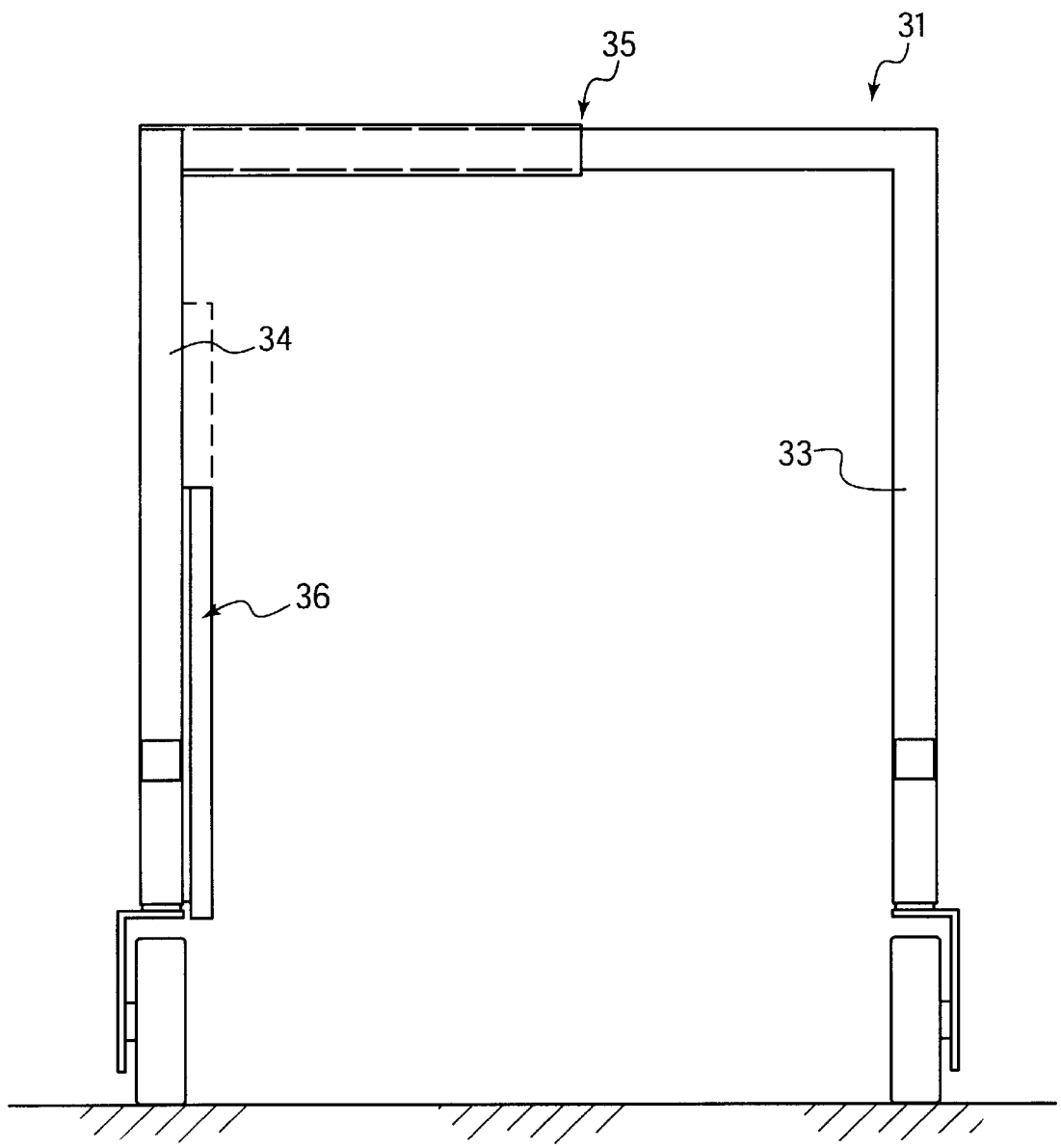
FIG. 9 is a front view of the screening device of FIG. 6.

FIG. 9 shows a front view of another embodiment of screening device 31. In this case, the upper struts forming the ceiling wall 35 of a screening device 31 consist of struts that are guided within each other, so that the track width can be changed by telescope-like extension or shortening. In addition, apron 36 is shown in its center position, and can be raised or lowered.

Figure 10:
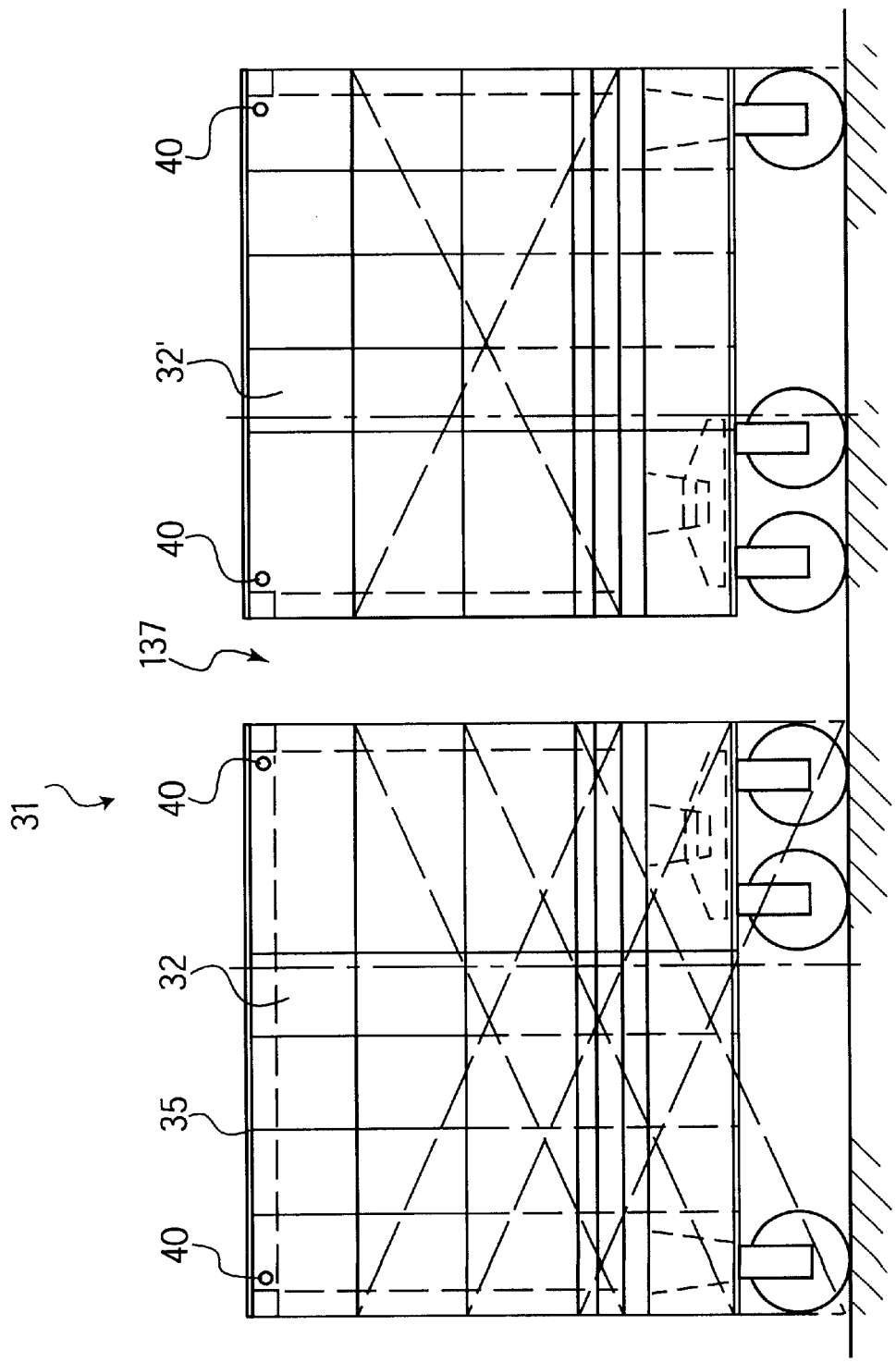
FIG. 10 is the side view of the screening device.

FIG. 10 shows a schematic side view of screening device 31. Screening device 31 is comprised of two tunnel hoods 32 and 32' running one after the other. These tunnel hoods are independently and separately driven and keep a spacing between each other. This spacing is shown as clear gap 137, in which the x-ray apparatus can be driven into its operating positions.

Hydraulic cylinders 40 are provided to adjust the track width by means of the strut sections (FIG. 9) within the zone of ceiling wall 35.

The screening walls of each tunnel hood 32 and 32' of screening device 31 are thicker in the areas adjacent to the x-ray equipment than in the remote areas of the walls. Therefore, the weighted load acting on the carriages of tunnel hoods 32, 32' is considerably higher in the x-ray equipment areas. Thus, the carriages of tunnel hoods 32 and 32' are designed in the form of multi-axle arrangements in the areas with the highest dead weight. As shown in FIG. 10., the carriages adjacent to the gap are designed in the form of twin-axle carriages.

Figure 11:
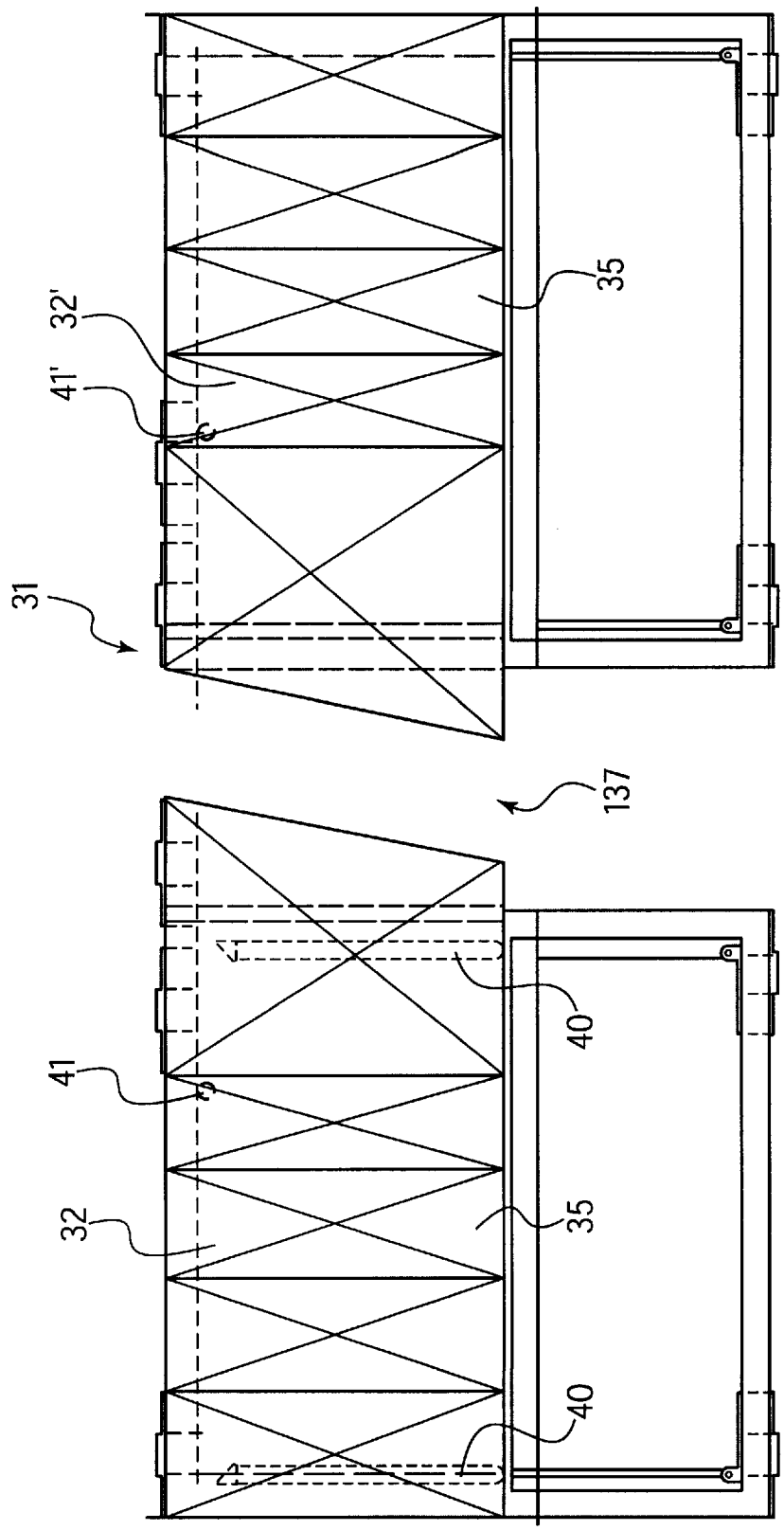
FIG. 11 is a top view of the screening device according to FIG. 10.

FIG. 11 shows a schematic top view of screening device 31 comprised of two tunnel hoods 32 and 32', with a gap 137 disposed in between. Hydraulic cylinders 40 are designed to adjust the track width of each tunnel hood. In the present embodiment, the piston rods of cylinders 40 are shown fully extended, which means the maximal possible track width of tunnel hoods 32 and 32'.

In addition, device 100 contains operating cylinders 41 and 41' for raising and lowering the aprons. As indicated in the present figure, cover or ceiling wall 35 consists of lead plates that prevent scattered x-rays from exiting upwardly from tunnel hoods 32 and 32' or screening device 31.

While several embodiments of the present invention have been shown and described, it is to be understood that many changes and modifications may be made thereunto without departing from the spirit and scope of the invention as defined in the appended claims.

What it is claimed:

1. A device for checking the contents of closed cargo carriers using x-rays comprising:
    two steerable single track carriages disposed parallel to each other;
    a plurality of vertical columns having a bottom end and a top end wherein said bottom end is supported by said carriages;
    a yoke having a right end and a left end connected to said top end of each vertical column so as to space apart said carriages, said yoke being vertically movable on said columns;
    a first series of supporting elements connected to said right end and said left end of said yoke;
    a cross beam having a first end and a second end disposed on said yoke and spanning between said carriages;
    a first and a second support respectively connected to said first end and said second end on said cross beam;
    an x-ray radiation source disposed on one side of said cross beam and connected to said first support; and
    a receiving screen located on the opposite side of said cross beam so that when said device travels along the cargo carriers, it x-rays the contents of these carriers.

2. The device according to claim 1, wherein each said column extends from a center region in each associated carriage.

3. The device according to claim 1, wherein each of said columns comprises a fixed segment, and at least one displaceable segment designed to telescope out from said fixed segment, wherein said at least one displaceable segment is connected to each other by said yoke.

4. The device according to claim 3, wherein each carriage is designed so that said displaceable segments have a release mechanism capable of releasing over each of said carriages.

5. The device according to claim 1, wherein each of said column has a rectangular shape.

6. The device according to claim 1, wherein said supporting elements are cantilevers aligned substantially horizontal and parallel relative to each other.

7. The device according to claim 6, further comprising:
    a projecting platform connected to said yoke opposite said radiation source;
    a set of operating controls for controlling an energy supply for the x-ray machine located on said projecting platform; and;
    an operator's cabin located on said platform.

8. The device according to claim 1, wherein each cantilever is designed in the form of a rod mechanism.

9. The device according to claim 1, wherein said cross bar is rotatably supported on said first set of supporting elements, rotating around a horizontal axle, said device further comprising at least one support designed to counteract the rotation of said cross bar.

10. The device according to claim 9, wherein said first series of supporting elements each have vibration dampening elements.

11. The device according to claim 9, wherein at least one support in said first series of supports is connected to said yoke, wherein when said cross bar rotates about its horizontal axle, said at least one support is receives tensile stress and said support further comprises at least one dampening element serving as a vibration absorber.

12. The device according to claim 1, further comprising at least one screening device for protecting against radiation.

13. The device according to claim 12, wherein each screening device comprises a tunnel hood for covering the cargo container, said tunnel hood having walls with linings designed to block x-rays.

14. The device according to claim 13, wherein the screening material is in the form of lead plates or mats.

15. The device according to claim 12, wherein each screening device is equipped with at least one carriage.

16. The device according to claim 15, wherein each screening device is designed in the form of a self-propelled unit having its own drive unit and separate control unit.

17. The device according to claim 16, further comprising a system coupled to said at least one screening device for synchronizing the drive unit and guiding control unit of said screening device with respect to said drive unit and control unit of said x-ray device.

18. The device according to claim 15 wherein said screening wall comprises an upper screening wall and a lower screening wall wherein said lower screening wall disposed adjacent to said receiving screen is extendible.

19. The device according to claim 18 further comprising an apron guided in vertical guides wherein at least one drive is associated with each apron.

20. The device according to claim 19, wherein each drive is an operating cylinder.

21. The device according to claim 12 wherein the screening walls of each tunnel hood are thicker in areas disposed adjacent to the x-ray installation during operation.

22. The device according to claim 21, wherein each carriage of each tunnel hood has multi-axle arrangements in the areas of its highest concentration of weight with respect to the dimensions of the screening walls.

* * * * *